US012561698B2

(12) United States Patent
Sailer et al.

(10) Patent No.: US 12,561,698 B2
(45) Date of Patent: Feb. 24, 2026

(54) DETECTING POTENTIALLY NON-COMPLIANT SHORT-LIVED ASSETS IN A COMPUTING PLATFORM

(71) Applicant: INTERNATIONAL BUSINESS MACHINES CORPORATION, Armonk, NY (US)

(72) Inventors: Anca Sailer, Scarsdale, NY (US); Andrew Douglas Hately, Austin, TX (US); Vikas Agarwal, Noida (IN)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 18/318,651

(22) Filed: May 16, 2023

(65) Prior Publication Data

US 2024/0386440 A1 Nov. 21, 2024

(51) Int. Cl.
 *G06Q 30/018* (2023.01)
 *G06F 8/61* (2018.01)

(52) U.S. Cl.
 CPC .............. *G06Q 30/018* (2013.01); *G06F 8/62* (2013.01)

(58) Field of Classification Search
 None
 See application file for complete search history.

(56) References Cited

U.S. PATENT DOCUMENTS 9,087,333 B2 7/2015 Kim
10,728,282 B2 7/2020 Mestha

2020/0358826 A1* 11/2020 Helander ................ H04L 63/20
2021/0097507 A1 4/2021 Mayer
2021/0248237 A1* 8/2021 Reich .................... G06F 21/566
(Continued)

FOREIGN PATENT DOCUMENTS

CN 111784404 A 10/2020
CN 113857079 A 12/2021
CN 114548633 A 5/2022
(Continued)

OTHER PUBLICATIONS

S. Richard, et al., "A Guide to OpenShift Compliance Operator Best Practices", Red Hat Inc., Mar. 22, 2023, 4 pp. [online][retrieved Apr. 28, 2023] https://cloud.redhat.com/blog/a-guide-to-openshift-compliance-operator-best-practices.
(Continued)

*Primary Examiner* — Rashida R Shorter
(74) *Attorney, Agent, or Firm* — Konrad, Raynes, Davda & Victor LLP; David Victor

(57) ABSTRACT

Provided are a computer program product, system, and method for detecting potentially non-compliant short-lived assets in a computing platform. In response to a command to delete a program module, a determination is made as to whether the program module has a life less than a predetermined time. A determination is made of a subset of assessment rules from at least one compliance profile to execute in response to determining that the life of the program module is less than the predetermined time. The subset of assessment rules is executed in the computational platform to determine the program module compliance with the subset of assessment rules. Compliance results of the program module compliance with the subset of assessment rules are saved.

20 Claims, 4 Drawing Sheets

400ᵢ

402    404

Behavioral Attribute | Rule Subset

Behavioral Attribute Rule Subset

(56) References Cited

U.S. PATENT DOCUMENTS

2022/0286482 A1* 9/2022 Barday ................. H04L 51/18

FOREIGN PATENT DOCUMENTS

CN         115331772  A    11/2022
WO         201967627  W     4/2019

OTHER PUBLICATIONS

K. Calligan, "Openshift Compliance Operator", myopenshiftblog, Jul. 29, 2021, 13 pp., [online][retrieved Apr. 28, 2023] https://myopenshiftblog.com/openshift-compliance-operator/.
"OpenShift Container Platform 4.12", Red Hat Inc., Apr. 21, 2023, 285 pp.
A. Vyas, "Red Hat OpenShift Compliance Operator Overview", techbeatly, Apr. 11, 2023, 9 pp., [online][retrieved Apr. 28, 2023] https://www.techbeatly.com/red-hat-openshift-compliance-operator-ove . . . .

* cited by examiner

Figures 2, 3, 4, 5:
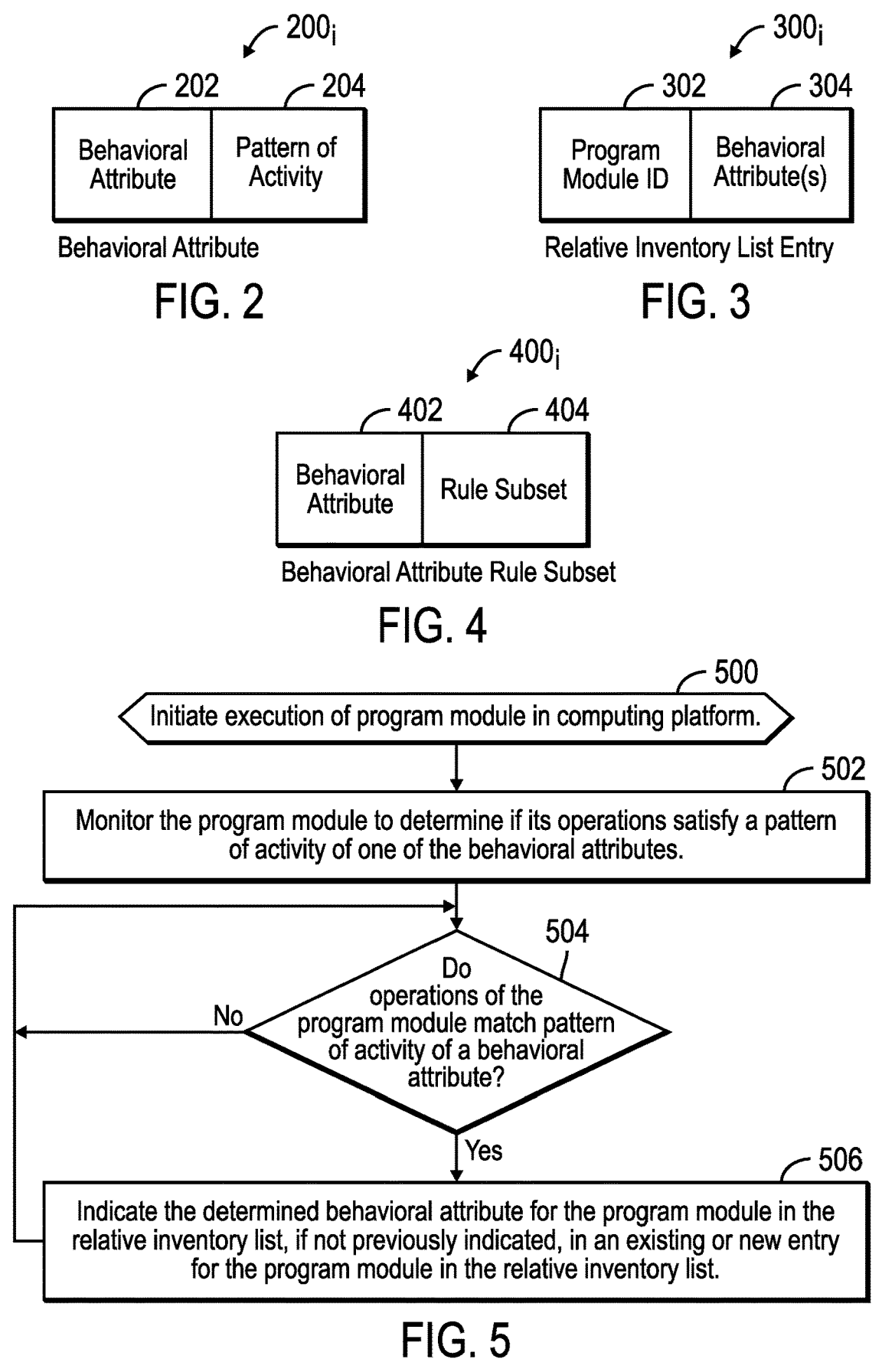

200ᵢ

202     204

| Behavioral Attribute | Pattern of Activity |
|---|---|

Behavioral Attribute

| Program Module ID | Behavioral Attribute(s) |
|---|---|

Relative Inventory List Entry

| Behavioral Attribute | Rule Subset |
|---|---|

Behavioral Attribute Rule Subset

Initiate execution of program module in computing platform.

502

Monitor the program module to determine if its operations satisfy a pattern of activity of one of the behavioral attributes.

504

Do operations of the program module match pattern of activity of a behavioral attribute?

No

Yes

506

Indicate the determined behavioral attribute for the program module in the relative inventory list, if not previously indicated, in an existing or new entry for the program module in the relative inventory list.

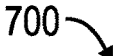

Computer 701

Processor Set 710

Processing Circuitry 720    Cache 721

Communication Fabric 711

Volatile Memory 712

Persistent Storage 713

Operating System 722

Compliance Operator
108

Compliance Behavioral Monitor
114

745

Peripheral Device Set 714

UI Device Set 723    Storage 724    IoT Sensor Set 725

Network Module 715

WAN 702

End User Device 703

Remote Server 704

Remote Database 730

Private Cloud 706

Gateway 740

Public Cloud 705

Cloud Orchestration Module 741    Host Physical Machine Set 742

Virtual Machine Set 743    Container Set 744

FIG. 7

DETECTING POTENTIALLY NON-COMPLIANT SHORT-LIVED ASSETS IN A COMPUTING PLATFORM

BACKGROUND OF THE INVENTION

1. Field of the Invention

The present invention relates to a computer program product, system, and method for detecting potentially non-compliant short-lived assets in a computing platform.

2. Description of the Related Art

In cloud computing environments, a compliance operator is deployed to scan computational resources, such as containers, pods of containers, and other programs, for compliance with industry, government, and company compliance standards. One example of a compliance operator is the Red Hat® OpenShift® on IBM® Cloud Compliance Operator (OSCO) that comes with various industry and government standard profiles that have different rules of assessment based on the nature of their compliance. The compliance operator may be scheduled to scan the system resources for compliance with government and industry standards and store the compliance results for assessment rules executed from the compliance profile. The saved results may indicate further action to remedy failed assessments. (IBM is a trademark of International Business Machines Corporation throughout the world and Red Hat and OpenShift are trademarks of Red Hat, Inc throughout the world).

For example, compliance scanning may be performed to assess compliance with government regulations on how programs and system services handle personal information, including financial and medical information. Government compliance regulations may require an organization run certain compliance scans on their systems to ensure compliance with the relevant regulations and industry benchmarks.

There is a need in the art for improved techniques to perform a compliance scan on computing resources to determine whether deployed programs are in compliance.

SUMMARY

Provided are a computer program product, system, and method for detecting potentially non-compliant short-lived assets in a computing platform. In response to a command to delete a program module, a determination is made as to whether the program module has a life less than a predetermined time. A determination is made of a subset of assessment rules from at least one compliance profile to execute in response to determining that the life of the program module is less than the predetermined time. The subset of assessment rules is executed in the computational platform to determine the program module compliance with the subset of assessment rules. Compliance results of the program module compliance with the subset of assessment rules are saved.

BRIEF DESCRIPTION OF THE DRAWINGS

FIG. 2 illustrates an embodiment of behavioral attribute information providing a pattern of activity that defines a behavioral attribute.

FIG. 3 illustrates an embodiment of a relative inventory list entry for a program module of program modules to consider for a partial compliance scan.

FIG. 4 illustrates an embodiment of information on a rule subset of assessment rules from one or more compliance profiles for a behavioral attribute.

FIG. 5 illustrates an embodiment of operations to initiate execution of a program module.

FIG. 7 illustrates a computing environment in which the components of FIG. 1 may be implemented.

DETAILED DESCRIPTION

Described embodiments provide improvements to computer technology for compliance auditing of organizational computing platforms. Currently, a compliance scan is periodically scheduled to scan the system to determine if the programs are complying with various assessment rules provided in a compliance profile for government and industry standards and requirements. However, between the time of compliance scans, certain short-lived programs may execute and then be deleted before being subject to a compliance scan. Such short-lived programs may perform non-compliant operations and never be detected because they were created and deleted before a scheduled scan.

Described embodiments address this problem of short-lived, non-compliant programs avoiding compliance scans, by tracking programs, such as containers, virtual machines, and pods of containers, that come into existence between scans and monitor their behavior. If a program is short-lived, then the compliance operator program may execute a subset of assessment rules from the compliance profiles relevant to the program before it is deleted. The subset of compliance rules may be tailored toward behavioral attributes of the short-lived program to perform a partial compliance scan that may have less a negative impact on system performance than a full compliance scan that runs all the assessment rules to audit and analyze program operations.

Figure 1:
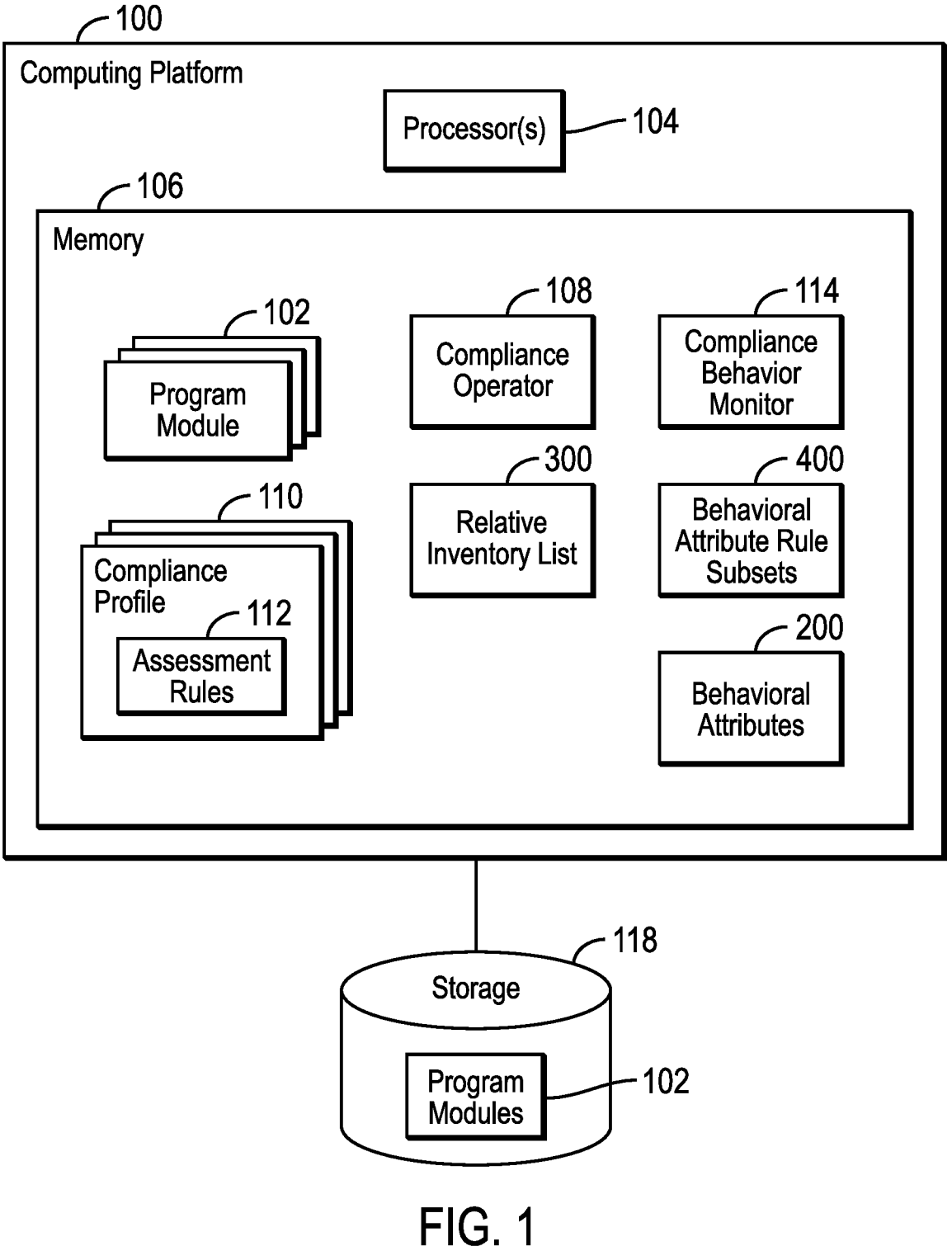
FIG. 1 illustrates an embodiment of a computing environment.

FIG. 1 illustrates an embodiment of a computing platform 100, such as a bare metal machine, that hosts program modules 102, such as application containers that may be grouped as pods, virtual machines, etc. In certain embodiments, the computing platform 100 may be a node in a cluster of nodes, such as a Kubernetes cluster, where the nodes may have the same structure as computing platform 100. The computing platform 100 includes a processor complex 104 of one or more processing units and a memory 106 in which the program modules run 102. The computing platform 100 further includes a compliance operator 108 to process one or more compliance profiles 110 having assessment rules 112. The compliance operator 108 runs the assessment rules 112, implementing compliance rules, to assess operations performed by program modules 102.

The assessment rules 112 may process various log files, program output, and other information maintained in the computing platform 100 to determine the behavior and operations of program modules 102 and whether the program modules 102 are operating within industry standard compliance benchmarks and government standards. The results of running compliance profiles 110 ensure regulatory readiness. The regulatory readiness can be imposed by national standards, industry standards or an organization's corporate government framework. The results of the assessment rules 112 may indicate gaps in the operations of the program modules 102 in complying with industry and government standards, such as security gaps, improper handling of personal information, etc., and ways to remedy any noted gaps and problems.

A compliance behavior monitor 114 monitors the execution of program modules 102 to determine if their pattern of operations matches a pattern of activity defined for a behavioral attribute in the behavioral attributes 200. Examples of patterns of activity for behavioral attributes 200 that are monitored include, but are not limited to, a short life span; specified abnormal behavior, such as running a new virtual machine during off-hours; unexpected performance degradation caused by the program module 102; price change in cost of the program module 102 execution exceeding a cost constraint; the program module 102 executing with a high security profile; the program module 102 having a specified role based access control (RBAC); etc.

Program modules 102 whose operations fall within one of the patterns of activity identified in the behavioral attributes 200 are indicated on a relative inventory list 300. In this way, the relative inventory list 300 provides a list of fuzzy rogue assets or assets that are not yet confirmed to be suspicious or engaged in non-compliant behavior but whose behavior indicates they have the potential for engaging in non-compliant activities. Such potential fuzzy rogue assets should be subject to partial compliance scans even if they will not live long enough to be subject to a full compliance scan. A full compliance scan comprises a scan executing all the assessment rules 112 in one or more compliance profiles 110 applicable to the computing platform 100. The full compliance scan may be periodically scheduled to execute and determine the compliance of program modules 102 running in the computing platform 100.

The memory 106 further stores behavioral attribute rule subsets 400 that provide rule subsets of assessment rules 112 from one or more compliance profiles 100 that are associated with behavioral attributes. A rule subset may provide assessment rules 120 applicable to a program module 102 having a relatively short life to generate compliance results for a program module 102 that may not execute long enough to be subject to a scheduled full compliance scan. When a program module 102 indicated on the relative inventory list 300 is subject to a delete command, the compliance operator 108 intervenes to select the applicable rule subset associated with the behavioral attributes identified for the executing program modules 102 indicated in the relative inventory list 300. This determined rule subset is executed to generate compliance results relevant to the operations of the program module 102 about to be deleted. This allows for compliance scans to capture operations of certain program modules 102 that may not be subject to the regularly scheduled full compliance scans because they are too short-lived to be captured.

The computing platform 100 may load program modules 102 from a storage 118 connected to the computational platform 100 through a direct line or over a network.

The program components of FIG. 1, including components 102, 108, 114, 110, 112 may comprise program code loaded into the memory 106 and executed by one or more processors 104. Alternatively, some or all of the functions may be implemented as microcode or firmware in hardware devices, such as in Application Specific Integrated Circuits (ASICs).

The storage 118 may comprise one or more non-volatile storage devices known in the art, such as a solid state storage device (SSD) comprised of solid state electronics, NAND storage cells, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 106 may comprise a suitable volatile or non-volatile memory to implement the components of the computing platform 100.

FIG. 2 illustrates an embodiment of an instance of a behavioral attribute 200$_i$, in the behavioral attributes 200, having a behavioral attribute name 202, such as abnormal behavior, performance degradation, price increase, security issue, etc., and an associated pattern of activity 204 that a program module 102 must perform or satisfy in order to be classified as having the behavioral attribute.

In an alternative embodiment, the compliance behavior monitor 114 may comprise a classification machine learning model implementing a neural network or other machine learning technology to receive as input a pattern of activity of a program module 102 and output a classification of a behavioral attribute 202 for the program module 102 activity.

FIG. 3 illustrates an embodiment of an instance of an entry 300$_i$ in the inventory list 300, and indicates a program module identifier (ID) 302 and one or more behavioral attributes 304 detected for the executing program module 302 by the behavior monitor 114.

FIG. 4 illustrates an embodiment of an instance of a behavioral attribute rule subset 400$_i$ as including a behavioral attribute 402 and a rule subset 404 comprising one or more of the assessment rules 112 in one or more of the compliance profiles 110 that are relevant for determining compliance by a program module engaged in a pattern of activity 204 associated with the behavioral attribute 402 of the rule subset 404.

FIG. 5 illustrates an embodiment of operations performed by the compliance operator 108 and the compliance behavioral monitor 114 to start monitoring of a program module 102 that began executing. Upon initiating (at block 500) execution of a program module 102, the compliance behavior monitor 114 monitors (at block 502) the program module 102 to determine if its operations satisfy a pattern of activity 204 associated with one of the behavioral attributes 200$_i$. If (at block 504) the operations of the program module 102 match the pattern of activity 204 of one of the defined behavioral attributes 200$_i$, then the determined behavioral attribute 202 is indicated (at block 506) in an existing or new entry 300$_i$ for the program module in the relative inventory list 300. If there is a pre-existing entry 300$_i$ for the program module 302, then the new detected behavioral attribute 202, associated with the observed pattern of activity 204, is added to field 304. An entry 300$_i$ for a program module 102 may indicate multiple behavioral attributes detected for the program module 102.

If there is no match (at block 504) or after indicating (at block 506) the detected behavioral attribute 202 in an entry 300$_i$ in the inventory list 300 for the program module 102, control proceeds back to block 504 to continue monitoring the program module 102 for additional behavioral attributes detected for the program module 102.

With the embodiment of FIG. 5, behavioral attributes detected for the program modules 102 are indicated in a relative inventory list 300. This information on gathered behavioral attributes is later used if a program module 102 is short-lived to determine a partial compliance scan of a subset of assessment rules 112 of the compliance profiles 110 to apply.

Figure 6:
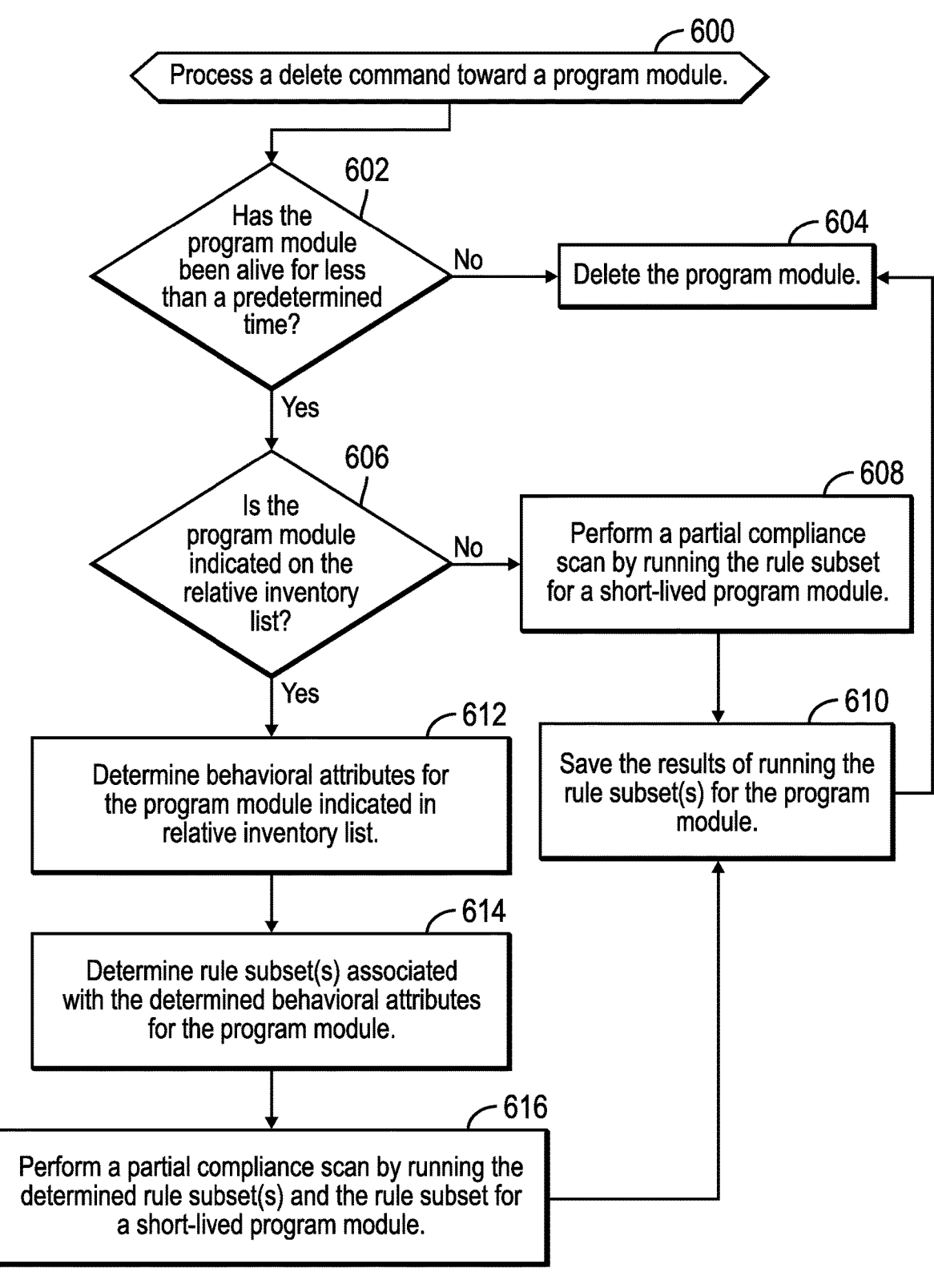
FIG. 6 illustrates an embodiment of operations to perform a partial compliance scan on program modules in the computing environment in response to an operation to delete the program module.

FIG. 6 illustrates an embodiment of operations performed by the compliance operator 108 to determine whether to perform a partial compliance scan on a program module subject to a delete command and a subset of the assessment rules 112, in a rule subset 404, to apply as part of the partial compliance scan. Upon processing (at block 600) a delete command directed to a program module 102, if (at block 602) the program module 102 to delete has been alive for more than a predetermined time, such as has been already subject to a full compliance scan involving the assessment rules 112 of all applicable compliance profiles 110, then the program module is deleted (at block 604).

In certain embodiments, the predetermined time may be set to a time interval between two scheduled full compliance scans to capture operations of program modules that have not lived long enough life to ensure being subject to a full compliance scan. Alternatively, the predetermined time may comprise a short life span indicating a suspicious program module 102. Yet further, the predetermined time may comprise a time range so that program modules having a life shorter than the lower duration of the range may also not be subject to a partial compliance scan. In a further embodiment, the partial compliance scan may not be performed if the short-lived program module 102 has already been subject to a full compliance scan.

If (at block 602) the program module has been alive for less than the predetermined time, i.e., is short-lived, and if (at block 606) the program module 102 is not indicated in the relative inventory list 300, meaning a behavioral attribute 402 has not been detected for the program module 102 to delete, then a partial compliance scan is performed (at block 608) by running a rule subset 404 of assessment rules 112 for a behavioral attribute 402 of short-lived. The results of running the subset of assessment rules 404 to audit program module 102 operations are saved (at block 610) in the memory 106 or storage 118. Control then proceeds to block 604 to delete the program module 102.

If (at block 606) the program module 102 to delete is indicated on the relative inventory list 300, then a determination is made (at block 612) of the one or more behavioral attributes 304 detected for the program module 102 in the inventory list entry 300; for the program module 102 to delete. One or more rule subsets 404 are determined (at block 614) for the one or more determined behavioral attributes 304 detected for the program module 102 from the behavioral attribute rule subsets 400. The compliance operator 108 performs (at block 616) a partial compliance scan by running the determined rule subset(s) 404 and the rule subset for a short-lived program module. Control then proceeds to block 610 to complete the compliance scan processing.

With the embodiment of FIG. 6, the compliance operator 108 performs a partial compliance scan before a program module is deleted if it is also short-lived to ensure that some level of compliance scan is performed to determine compliance for program modules that may be sufficiently short-lived to avoid being subject to a scheduled full compliance scan. This ensures all program modules, including those engaged in suspect behavior typical of a non-compliant program, are subject to some level of compliance testing.

Further, the compliance operator 108 performs a partial scan comprising a subset 404 of assessment rules 112 relevant to the behavioral attribute(s) of the program module 102 to limit the impact of this intermediary compliance scan on program module and computing platform 100 performance. In this way, the partial compliance scan by applying fewer than all assessment rules 112 applied during the scheduled full compliance scan allows some level of regulatory readiness while also limiting the effect on the performance of the computing platform 100.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code involved in performing the inventive methods, such as a compliance operator 108 and compliance behavioral monitor 114, described above, in code 745 to perform a partial compliance scan on program modules that indicate suspect behavioral attributes and are short-lived and not subject to a scheduled full compliance scan. In addition to code 745, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and code 745, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip."In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in code 745 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 745 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705.

The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for performing a compliance scan of program modules in a computing platform, the computer program product comprising a computer readable storage medium having computer readable program code embodied therein that when executed performs operations, the operations comprising:

in response to a command to delete a program module, determining whether the program has a life less than a predetermined time;

determining a subset of assessment rules from at least one compliance profile to execute in response to determining that the life of the program module is less than the predetermined time;

executing the subset of assessment rules in the computational platform to determine the program module compliance with the subset of assessment rules;

saving compliance results of the program module compliance with the subset of assessment rules; and deleting the program module after the executing the subset of assessment rules.

2. The computer program product of claim 1, wherein the program module is deleted in response to the saving the compliance results.

3. The computer program product of claim 1, wherein the predetermined time comprises a time interval between scheduled full compliance scans.

4. The computer program product of claim 1, wherein the operations further comprise:

performing a full compliance scan executing the assessment rules in at least one compliance profile at scheduled times, wherein the executing the subset of assessment rules is performed during a time interval between two of a scheduled full compliance scans.

5. The computer program product of claim 1, wherein the operations further comprise:

detecting whether the program module has engaged in a pattern of activity associated with a behavioral attribute, wherein the determined subset of assessment rules includes at least one assessment rule associated with the behavioral attribute detected for the program module.

6. The computer program product of claim 5, wherein the operations further comprise:

indicating program modules detected to have a pattern of activity associated with a behavioral attribute in an inventory list, wherein the inventory list indicates the behavioral attribute detected for the program module to delete, and wherein the determined subset of assessment rules is associated with the behavioral attribute indicated for the program module in the inventory list; and deleting indication of the program module from the inventory list in response to deleting the program module from the computing platform.

7. The computer program product of claim 5, wherein the behavioral attribute is one of a plurality of behavioral attributes having associated patterns of activity, including at least a plurality of:

a short life span;

specified abnormal behavior;

unexpected performance degradation caused by the program module;

price change in cost of execution of the program module exceeding a cost constraint;

high security profile; and a specified role based access control role assigned to the program module.

8. The computer program product of claim 1, wherein the program module is selected from the group consisting of a container comprising an application and dependencies of the application on the computing platform; a pod consisting of at least one container on the computing platform; and a virtual machine.

9. A system for performing a compliance scan of program modules in a computing platform, comprising:

a processor; and a computer readable storage medium having computer readable program code embodied therein that when executed by the processor performs operations, the operations comprising:

in response to a command to delete a program module, determining whether the program module has a life less than a predetermined time;

determining a subset of assessment rules from at least one compliance profile to execute in response to determining that the life of the program module is less than the predetermined time;

executing the subset of assessment rules in the computational platform to determine the program module compliance with the subset of assessment rules;

saving compliance results of the program module compliance with the subset of assessment rules; and deleting the program module after the executing the subset of assessment rules.

10. The system of claim 9, wherein the program module is deleted in response to the saving the compliance results.

11. The system of claim 9, wherein the predetermined time comprises a time interval between scheduled full compliance scans.

12. The system of claim 9, wherein the operations further comprise:

performing a full compliance scan executing the assessment rules in at least one compliance profile at scheduled times, wherein the executing the subset of assessment rules is performed during a time interval between two of a scheduled full compliance scans.

13. The system of claim 9, wherein the operations further comprise:

detecting whether the program module has engaged in a pattern of activity associated with a behavioral attribute, wherein the determined subset of assessment rules includes at least one assessment rule associated with the behavioral attribute detected for the program module.

14. The system of claim 13, wherein the operations further comprise:

indicating program modules detected to have a pattern of activity associated with a behavioral attribute in an inventory list, wherein the inventory list indicates the behavioral attribute detected for the program module to delete, and wherein the determined subset of assessment rules is associated with the behavioral attribute indicated for the program module in the inventory list; and deleting indication of the program module from the inventory list in response to deleting the program module from the computing platform.

15. A method for performing a compliance scan of program modules in a computing platform, comprising:

in response to a command to delete a program module, determining whether the program module has a life less than a predetermined time;

determining a subset of assessment rules from at least one compliance profile to execute in response to determining that the life of the program module is less than the predetermined time;

executing the subset of assessment rules in the computational platform to determine the program module compliance with the subset of assessment rules;

saving compliance results of the program module compliance with the subset of assessment rules; and deleting the program module after the executing the subset of assessment rules.

16. The method of claim 15, wherein the program module is deleted in response to saving the compliance results.

17. The method of claim 15, wherein the predetermined time comprises a time interval between scheduled full compliance scans.

18. The method of claim 15, further comprising:

performing a full compliance scan executing the assessment rules in at least one compliance profile at scheduled times, wherein the executing the subset of assessment rules is performed during a time interval between two of a scheduled full compliance scans.

19. The method of claim 15, further comprising:

detecting whether the program module has engaged in a pattern of activity associated with a behavioral attribute, wherein the determined subset of assessment rules includes at least one assessment rule associated with the behavioral attribute detected for the program module.

20. The method of claim 19, further comprising:

indicating program modules detected to have a pattern of activity associated with a behavioral attribute in an inventory list, wherein the inventory list indicates the behavioral attribute detected for the program module to delete, and wherein the determined subset of assessment rules is associated with the behavioral attribute indicated for the program module in the inventory list; and deleting indication of the program module from the inventory list in response to deleting the program module from the computing platform.

* * * * *